(12) United States Patent
Galm (10) Patent No.: US 7,589,438 B2
(45) Date of Patent: Sep. 15, 2009

(54) SOURCE PHASE SENSITIVE TRANSFER METHOD AND APPARATUS

(75) Inventor: James M. Galm, Shaker Heights, OH (US)

(73) Assignee: LayerZero Power Systems, Inc., Chagrin Falls, OH (US)

( * ) Notice: Subject to any disclaimer, the term of this patent is extended or adjusted under 35 U.S.C. 154(b) by 19 days.

(21) Appl. No.: 11/160,759

(22) Filed: Jul. 7, 2005

(65) Prior Publication Data

US 2006/0006742 A1    Jan. 12, 2006

Related U.S. Application Data

(60) Provisional application No. 60/586,647, filed on Jul. 9, 2004.

(51) Int. Cl.
*H01H 83/00* (2006.01)
*H02J 9/04* (2006.01)
*H02J 3/00* (2006.01)
*H02H 3/00* (2006.01)

(52) U.S. Cl. .......................... 307/127; 307/68; 307/85; 307/86; 307/87; 361/78; 361/85

(58) Field of Classification Search ................. 307/127, 307/68, 85, 86, 87; 361/78, 85
See application file for complete search history.

(56) References Cited

U.S. PATENT DOCUMENTS

| | | | | |
|---|---|---|---|---|
| 3,491,248 A | * | 1/1970 | Beckwith et al. ............... | 307/87 |
| 4,256,972 A | * | 3/1981 | Wyatt et al. .................... | 307/68 |
| 4,310,771 A | * | 1/1982 | Wyatt et al. .................... | 307/64 |
| 4,311,919 A | * | 1/1982 | Nail ............................ | 307/64 |
| 4,405,867 A | * | 9/1983 | Moakler et al. ............... | 307/64 |
| 4,879,624 A |   | 11/1989 | Jones et al. .................... | 361/65 |
| 5,182,464 A |   | 1/1993 | Woodworth et al. .......... | 307/87 |
| 5,311,066 A |   | 5/1994 | Malloy et al. ................. | 307/87 |
| 5,355,024 A |   | 10/1994 | Elliott et al. .................. | 307/73 |
| 5,461,263 A |   | 10/1995 | Helfrich ....................... | 307/64 |

(Continued)

OTHER PUBLICATIONS

"Syncrotran Motor Bus Transfer System M-0272 MOD 493/M-0236B", Beckwith Electric Co., Inc., http://www.beckwithelectric.com/bse/m0272/M_0272_SP_MOD493.pdf, visited Jun. 20, 2007.*

(Continued)

*Primary Examiner*—Albert W Paladini
*Assistant Examiner*—Hal I Kaplan
(74) *Attorney, Agent, or Firm*—Rankin, Hill & Clark LLP (57) ABSTRACT

A method and apparatus for transferring AC electrical power to a load from a first power source to a second power source provides for a time delay in the transfer to avoid problems associated with differences in the phases between the power sources. The phase of the voltage waveform from each power source is sensed continuously, and the phase difference is known at all times, so that it can be used when the transfer is necessary. The method and apparatus monitors the voltage from the first power source, and initiates the transfer from the first power source to the second power source in response to an unacceptable condition from the first power source. The second power source is connected only after waiting for a period of time corresponding to the appropriate time delay.

21 Claims, 4 Drawing Sheets

U.S. PATENT DOCUMENTS

| | | | |
|---|---|---|---|
| 5,555,151 A | 9/1996 | Baker et al. | 361/79 |
| 5,555,182 A | 9/1996 | Galm | 702/69 |
| 5,621,254 A * | 4/1997 | Takeda et al. | 307/64 |
| 5,635,772 A * | 6/1997 | Lagree et al. | 307/64 |
| 5,644,175 A | 7/1997 | Galm | 307/131 |
| 5,729,059 A | 3/1998 | Kilroy et al. | 307/84 |
| 5,739,594 A | 4/1998 | Sheppard et al. | 307/64 |
| 5,770,897 A * | 6/1998 | Bapat et al. | 307/127 |
| 5,784,240 A | 7/1998 | Przywozny | 361/85 |
| 5,814,904 A | 9/1998 | Galm | 307/130 |
| 5,838,077 A | 11/1998 | Chelcun et al. | 307/130 |
| 6,191,500 B1 * | 2/2001 | Toy | 307/64 |
| 6,630,752 B2 * | 10/2003 | Fleming et al. | 307/64 |
| 6,700,222 B2 * | 3/2004 | Turvey | 307/87 |
| 7,129,599 B2 * | 10/2006 | Divan et al. | 307/65 |
| 2001/0017485 A1 * | 8/2001 | Yoo | 307/66 |

OTHER PUBLICATIONS

"Syncrotran Motor Bus Transfer System M-0272A/M-0236B", Beckwith Electric Co., Inc., http://www.beckwithelectric.com/bse/m0272/SP/M-0272A-0236B-SP-00%20(08-05)%20screen.pdf, visited Jun. 20, 2007.*

* cited by examiner

SOURCE PHASE SENSITIVE TRANSFER METHOD AND APPARATUS

FIELD OF INVENTION

The present invention relates to a solid-state transfer system for providing multiple current paths between several power sources and a load that is energized by any of those sources. More specifically the invention relates to a solid-state transfer system and method for efficient switching between active current carrying devices in a way less likely to cause damage to circuits and components connected to the power sources or to the power sources themselves.

BACKGROUND OF THE INVENTION

It is often important and sometimes critical that a back-up power source be available in case a primary power source is either unavailable or degrades until it is not suitable for powering a load. A large computer center may, for example, have access to two or more separate sources of alternating current power for operating some or all of the equipment.

Solid-state transfer switches (SSTS) are normally used in these mission critical environments, such as computer centers, where the loads must remain powered, even when various parts of the electrical system fail. Solid-state transfer switches often include source quality monitoring facilities to automatically initiate a transfer from one source to another in the event that the active source fails. Since the solid-state transfer switch represents the place in the power system where multiple redundant sets of power sources and wiring come together to power the load, the transfer switch is potentially a single point of failure in the system. For that reason, solid-state transfer switches are designed for the utmost reliability and fault tolerance.

These switches utilize pairs of gate activated silicon controlled rectifiers or SCRs that are connected in parallel. Each pair of SCRs conducts current from a single pole of alternating current to a load. One SCR conducts current in one direction and a second, oppositely connected SCR conducts current in a second direction as the AC source switches polarity. When both SCRs are gated into conduction, first one and then the other SCR provides a low resistance path for alternating current power as current flow alternates back and forth during the AC power cycle. A transfer from a faulty power source to an alternate power source requires the active or conductive SCRs be de-activated and a second set of SCRs pairs be activated to couple an alternate power source to the load.

These solid-state transfer switches switch between the sources very rapidly, so that there is minimal effect on the load as it is switched from one source to the other. Because the switches involve no moving part, the switching action is extremely fast, generally much faster than any load could respond to the momentary disruption of power. Furthermore, solid-state transfer switches are carefully designed to insure that at no time the incoming sources be allowed to be connected together. Such a connection, however brief, would have catastrophic consequences for the electrical power system of the facility.

Examples of such solid-state transfer switches and methods of their operation are shown in U.S. Pat. No. 5,555,182, U.S. Pat. No. 5,644,175 and U.S. Pat. No. 5,814,904, each issued to the present inventor.

In most mission critical systems, the secondary power source feeding the SSTS is a single-phase or three-phase voltage source originating at large uninterruptible power systems, engine driven generators or dedicated utility substations. One aspect of these sources is that there is often no guarantee that the phase of the voltage waveforms provided by each source is precisely in phase with the voltage provided by the other source or sources. Although there are often circuits or equipment intended to maintain phase synchronization between the sources, these circuits or equipment represent single points of failure in the system, and tend to be unreliable. The net result is that the sources feeding the SSTS are sometimes out of phase with each other.

A common circuit configuration for mission critical facilities is to distribute electrical power at a higher voltage than the load equipment needs, and step it down to the required voltage at the point of use using a simple transformer. The SSTS is often placed upstream of the transformer in the circuit, i.e., between the transformer and the power sources. This arrangement causes the transformer to be a potential single point of failure, but it is a risk that is often assumed in the interest of economy, and in view of the fact that transformers are generally very reliable devices.

The type of power system described thus far is common in practice, being used in a large number of existing mission critical facilities, although it has a very serious drawback that compromises its overall reliability. Transformers are built of ferromagnetic materials that are subject to saturation if the number of volt-seconds of flux applied to the transformer exceeds a threshold. Volt-seconds of flux are regarded as the time integral of voltage applied to the transformer. Either a small voltage applied for a long time or a large voltage applied for a short time has the same effect, i.e., adding to the total number of volt seconds of flux being supported by the transformer. When the total volt seconds of flux exceeds the capacity of the transfer, the transformer saturates. When a transformer saturates, the impedance of the transformer drops sharply, resulting in the transformer drawing a large amount of current from its power source. This saturation current can cause upstream circuit breakers to trip open, as well as causing the uninterruptible power systems and engine generators to malfunction. Any of these consequences has devastating effects on a mission critical facility.

A power system as described above is vulnerable to failure when a SSTS creates a nearly instantaneous transfer between sources that are out of phase, where the load includes a ferromagnetic transfer. The out-of-phase transfer has the consequence of potentially adding volt-seconds of flux to the transformer far in excess of design limits, initiating a cascade of failures in the power system. Consider the result of a transfer between two sources that are 180° out of phase. If the transfer occurs at the end of one positive half-cycle of voltage, it will be followed by another positive half-cycle of voltage. Two consecutive positive half-cycles of voltage will exceed the transformer flux limit and start the cascade of failures. This disastrous situation has been observed in practice.

SUMMARY OF INVENTION

The disadvantages of the prior art are overcome by the present invention of a source phase sensitive transfer method and apparatus. The present invention solves the problems associated with essentially instantaneous transfer by assuring that the transfer time is a function of the phase angle between the sources at the instant that a transfer is initiated. Whereas prior art SSTSs tried to minimize the amount of delay time, i.e., time when no source is connected to the load, the present invention purposely inserts a precisely timed amount of delay time into the transfer.

For example, in a situation involving a transfer between two sources that are 180° out of phase, where the prior art SSTS might supply to the load two consecutive positive half-cycles of voltage which would exceed the transformer flux limit and start the cascade of failures, the present invention avoids transformer saturation by inserting exactly one half cycle of delay time into the transfer. In such an example, the positive half cycle from the first source would be followed by one half cycle of delay time, followed by a negative half-cycle from the second source.

The present invention has particular advantages when employed in power supply systems that are connected to loads comprising transformers built of ferromagnetic materials. By avoiding instantaneous transfers and providing for a delay in the switching to a secondary power source, the present invention avoids the problems associated with transformer saturation, and the resulting draw of a large amount of current from the power source that can cause upstream circuit breakers to trip open, and uninterruptible power systems and engine generators to malfunction. In so doing, the present invention avoids consequences that can have devastating effects on a mission critical facility.

In order to effect in all situations, the amount of delay time inserted into the transfer must be a function of the phase angle between the sources at the instant of the transfer. There is a relationship between the ideal amount of delay time required and the angle between sources. Successful implementation of the invention requires that the phase angle difference between the sources be known with high accuracy at all times, and that the required delay time be continuously calculated and available at the instant that a transfer is required.

The purposeful insertion of delay time into the transfer sequence of an SSTS is counterintuitive to the premise that an SSTS should attempt to power the load as continuously as possible. However, it is clear that there are situations where the risk of causing widespread damage to a large mission critical facility outweighs the benefit of absolutely minimizing the transfer time associated with one SSTS and its load. The invention is thus useful in that it improves the reliability of the large-scale power system with respect to reliability without the invention. The present Information Technology Industry Council (ITIC) voltage-versus-time relationship expressing the requirements for powering mission critical loads allows for up to 20 milliseconds of zero voltage condition. Thus, the present invention provides transfers well within allowable zero voltage time limits.

To the knowledge of the present inventor, no prior art power management equipment have implemented anything similar to this invention, despite the long felt need for such a system. Persons of skill in the power electronics industry have lamented the existence of the essential problem for years, but no solution has been deployed. The product according to the present invention embodies a highly sophisticated signal processing and software infrastructure that supports the high-speed calculation required to realize the invention. Prior art products have lacked the infrastructure needed to implement such high-speed calculations.

The non-obviousness of the present invention is based on the counterintuitive notion that delay time inserted into SSTS transfers can actually improve the overall reliability of a mission critical power system, relative to systems where SSTS devices minimize delay time at under all circumstances. Only by careful understanding of the mechanism by which entire mission critical facilities can be compromised by transformer saturation, and by looking at the role of SSTS equipment in a non-obvious way, can one arrive at the realization that the invention solves the essential problem.

These and other advantages are provided by the present invention of a method of transferring alternating current electrical power to a load from a first power source to a second power source, each of the power sources having a voltage waveform. The method comprises the steps of sensing the phase of the voltage waveform from first power source, sensing the phase of the voltage waveform from the second power source, determining the difference between the sensed phases, calculating a time delay corresponding to the difference between the phases, e) monitoring the voltage supplied by the first power source; f) initiating a switch from the first power source to the second power source in response to a disruption of voltage being provided from the first power source monitored in step e by interrupting the supply of power from the first power source to the load; and g) connecting to the second power source after waiting for a period of time corresponding to the time delay calculated in step d.

The invention also comprises apparatus for controlled switching of power supplied to a load from a first AC power source to a second AC power source. The apparatus comprises a first set of solid state switches coupled to a junction, a second set solid state switches coupled to the junction, monitoring circuits for monitoring a current state through the switches for the first and second sets of switches, and a controller connected to the first and second switches for activating the switches and connected to the monitoring circuit. The controller comprises a stored program for sensing the phase of the voltage waveform from first power source, sensing the phase of the voltage waveform from the second power source, determining the difference between the phase of the voltage wave form from the first power source and the phase of the voltage wave form from the second power source, calculating a time delay corresponding to the difference, initiating the first set of switches from the first power source to the second power source by interrupting the supply of power from the first power source.

DETAILED DESCRIPTION OF PREFERRED EMBODIMENTS

Figure 1:
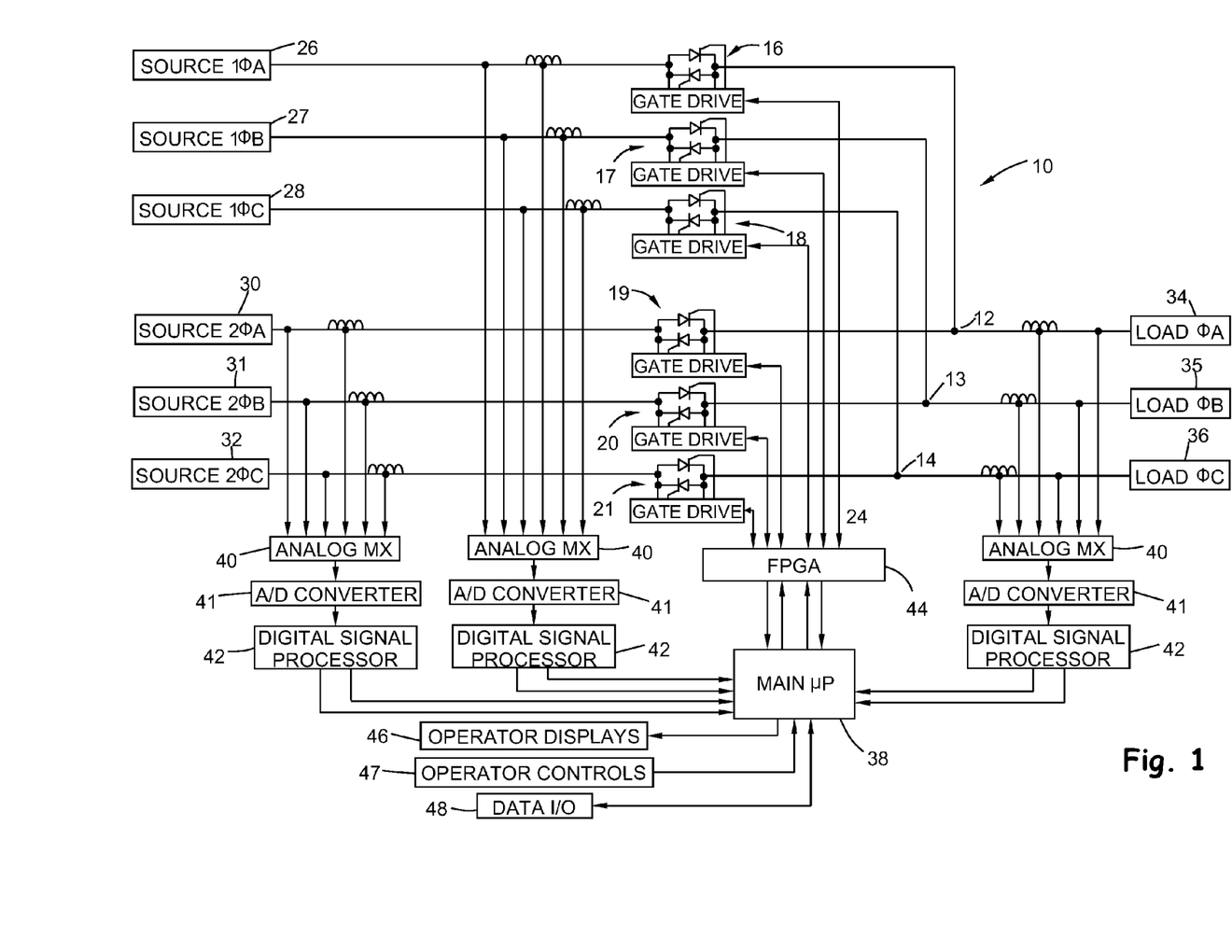
FIG. 1 is a block diagram of a monitoring system that determines the quality of a primary power source for energizing a load and utilizes a solid-state transfer switch to change to a secondary source in the event of a failure or degradation in the primary power source.

Referring more particularly to the drawings, and initially to FIG. 1, there is shown a block diagram of a control system 10 that controls application of power to a load 34-26 from either of two alternating current power sources 26-28 and 30-32. The control system 10 of FIG. 1 illustrates use of the invention with a three-phase power delivery system that has the capacity to switch two alternate power sources to a load under varying conditions. One possible use of the system 10 depicted in FIG. 1 is in a large computer center where it is important that at least some of the electrically powered equipment not lose power and hence a backup power is made available. Preferably, the system of the present invention is configured to handle two or more alternate power sources with three or more phases in each source, and the preferable system can handle as many as three different alternate power sources, each of which may have as many as five phases. However, for the purposes of simplifying the description of the system of the present invention, it will be described with reference to a load connected to receive power from one of only two sources each of which having only three phases. As will be understood, the system described herein, for example, could be modified to allow for the connection of more than two sources to the load.

The control system 10 controls alternate current paths through three junctions 12, 13 and 14 by means of two sets of three gate-controlled current carrying devices 16-21 connected to the junctions 12, 13 and 14. The primary three-phase power source comprises three inputs 26, 27 and 28, each providing a different phase in accordance with conventional three-phase power supplies. The secondary three-phase power source comprises three corresponding inputs 30, 31 and 32. The load comprises three corresponding phase outputs 34, 35 and 36.

FIG. 1 shows a use of the present invention for controlling the power supplied to a load connected to the junctions 12, 13 and 14. The three-phase load connections 34, 35 and 26 are powered by either the primary or secondary sources and hence are coupled to either the three inputs 26, 27 and 28 or the three inputs 30, 31 and 32.

As depicted in FIG. 1, basic transducers and signal conditioning electronics are used to connect the power circuit voltage and current signals to analog multiplexer circuitry 40, analog-to-digital converters, 41 and digital signal processors 42. The digital signal processors 42 monitor the condition of the three sets of alternating current signals, the two sets of AC signals from the two sources and the set of AC signals to the load, performing high speed calculations on the digitized signals, yielding various metering values and metrics of source quality and reporting them to the controller 38. The digital signal processors are preferably Analog Devices ADSP21062 floating point digital signal processors. A presently preferred controller 38 is implemented using a Motorola ColdFire MCF5292 high speed embedded microprocessor. Under certain specified conditions that are monitored by the controller 38, a transfer is initiated from one power source such as the primary source connected to the inputs 26, 27 and 28 to a second power source such as the secondary source connected to the inputs 30, 31 and 32.

To switch from one source to another, the controller 38 deactivates an active group of three device sets 16-18, for example, and activates an inactive group of three device sets 19-21. In accordance with known design, each device set includes a pair of gate-activated silicon controlled rectifiers (SCRs) that are connected in parallel. Each pair of SCRs conducts current from a single pole of alternating current from one of the sources to a load, with one SCR of the pair conducting current in one direction and the other oppositely connected SCR conducting current in the other direction as the AC source changes polarity. When both SCRs are gated into conduction, first one and then the other SCR provides a low resistance path for alternating current power as current flow alternates back and forth during the AC power cycle. Stated another way, during half the AC power cycle one of the two SCRs is forward biased and carries current to the load and during the other half of the AC power cycle the second of the two SCRs is forward biased and carries current to the load. To switch from one power source to another, the controller 38 deactivates an active device set by removing gate signals from gate inputs of the two parallel-path, opposite-sense current-carrying SCRs which combine to form an active device set.

To perform a safe, yet efficient transfer of power through the junctions 12, 13 and 14 from one source to another the controller 38 initiates a transfer and relies upon a field programmable gate array (FPGA) controller 44 to supervise the shutdown of the active device sets and start up the inactive device sets. The FPGA controller 44 is preferably a XILINX XCS40XL RAM based FPGA.

The operation of each of the device sets 16-21 and the activation and deactivation of the SCRs associated with each of these devices sets by means of the FPGA controller 44 is well known, and need not be described in detail. The controller 44 senses current through the two devices of each active device set 16-21 to determine a current carrying state for that set. When a transfer is initiated, controller 44 deactivates the gate control signals of the off going source and monitors the current carrying state of the SCRs just deactivated. When the current flowing through the deactivated SCRs becomes of sufficiently low magnitude for a sufficiently long time, controller 44 activates the gate control signals of the on coming source.

As further indicated in FIG. 1, the controller 38 is also connected to conventional peripheral devices to allow monitoring and control operation of the control system, including suitable operator displays 46 and controls 47 usually provided on an operator control panel, and data input/output devices 48.

The connections between the components in FIG. 1 are shown as discrete connections between components, and this is a conceptually accurate way of depicting the interrelationship between the components. In reality, a common bus architecture is employed with each of the components connected along a bus and the connections between the components controlled by the software operating on the controller 38 directing the flow of information between the components. Such bus architecture is well known, and need not be described in detail.

The main controller 38 executes a stored sequence of processing steps that constitute the main logic for the operation of the system. The main controller 38 is programmed using any suitable programming language, such as C, to execute all of the necessary functions of the control system, including decision making, maintenance of stored logs, communication with operators, reporting errors and sequencing of orderly system start up and shut down. Most of these functions are relatively routine, and the particular mode of operation and programming used to accomplish these functions is routine and need not be explained in detail. Two of the functions are particular to this invention, and these functions are the sensing of the phase of the voltages from the power sources and implementation of the transfer from one power source to another using this phase sensing information.

Phase Sensing

In accordance with the present invention, a certain amount of delay time is inserted into the transfer to avoid the consequences of the phase differences between the power sources. The amount of this delay time is denoted as TLIMIT. The value of TLIMIT is a function of the phase angle between the sources at the instant of the transfer. There is a relationship between the ideal amount of delay time required and the angle between sources. Successful implementation of the invention requires that the phase angle difference between the sources be known with high accuracy at all times, and that the required delay time be continuously calculated and available at the instant that a transfer is required. These calculations are carried out continuously by the controller 38 and the digital signal processors 42 in accordance with instructions programmed therein.

The dynamic phase compensated transfers are achieved by performing real time calculations of TLIMIT on an ongoing basis. In order to calculate TLIMIT, the following constants are utilized:

XA_BASE_TIME is set according to the value of the crystal oscillator or other device being used as a master logic time base. This is the time period of the transition clock that moves the FPGA state machine described below with reference to FIG. 2 from one state to the next. In this embodiment, XA_BASE_TIME is set to 42 μsec.

XA_BASE_PER_TICK is the number of XA_BASE_TIME intervals in one "tick" of the dynamic phase compensated transfer timer. XA_BASE_PER_TICK is calculated based on the desired length of time for one XA_TICK_TIME clock tick. With reference to the state diagram of FIG. 2, which will be discussed in more detail below, XA_BASE_PER_TICK is the desired value of XA_TICK_TIME divided by XA_BASE_TIME, minus 2. The two additional ticks are required to account for the state transition out of state S2 to state S3 and for the state transition out of state S3 to either state S2 or state S4, depending on the value of variable CNT. In this embodiment, XA_BASE_PER_TICK is set at 14 base time intervals.

Figure 2:
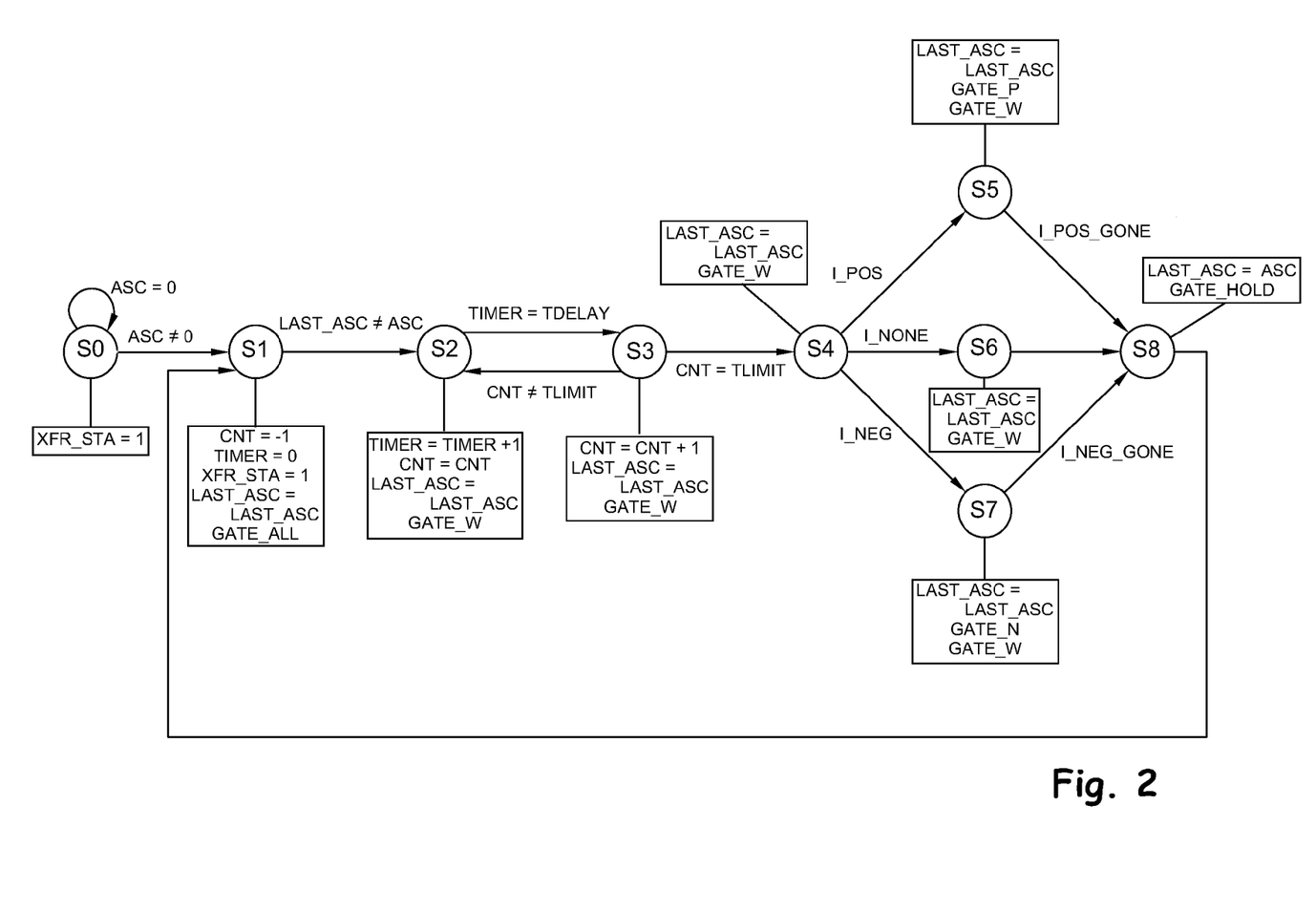
FIG. 2 is a state diagram of a control algorithm that is executed by the main controller to perform the transfer from one power source to another.

XA_TICK_TIME is time, in seconds, of one tick of the dynamic phase compensated transfer timer. It is calculated by multiplying XA_BASE_PER_TICK by XA_BASE_TIME. Where XA_BASE_PER_TICK is 14 state machine transitions and XA_BASE_TIME is 42 μsec, XA_TICK_TIME Is 0.588 msec.

XA_MIN_TIME is the smallest allowable transfer time expressed in seconds. In this embodiment of the invention, the minimum transfer time is accommodated by using TDELAY and designing a state machine that waits for the time of TDELAY before proceeding, so no further minimum time is required, and XA_MIN_TIME is set to zero. However, if additional time is necessary due to hardware delays, such additional time can be accommodated by setting XA_MIN_TIME to a non-zero value.

XA_WRAP_TOL_ANGLE is the phase angle, in degrees, that an on-coming source may lead the off-going source and be considered in phase, i.e., with no delay added to the transfer to compensate for the phase difference between the sources. As the phase lead from the on coming source to the off going source decreases from 360°, the amount of phase compensation delay required to achieve a dynamic phase compensated transfer increases. This process continues until the phase lead has reduced to the point where the sources have almost wrapped around and become in phase. Once the phase lead becomes less than XA_WRAP_TOL_ANGLE, additional delay is no longer added to the transfer. XA_MIN_TIME is set to 15° in this embodiment. This is, in effect, a tolerance accepted by the system to avoid implementing a delay time if the phase difference is so small that it would not otherwise affect the load.

XA_TICKS_PER_DEGREE is the number of dynamic phase compensation timer ticks per angular degrees of the power circuit waveform. It is calculated as (1/(XA_TICK_TIME*INITIAL_LINE_FREQ*360) where INITIAL_LINE_FREQ is 60 Hz for a power system operating at a frequency of 60 Hz, and thus XA_TICKS_PER_DEGREE is equal to 0.0787 ticks.

XA_MIN_TICKS is the number of dynamic phase compensation timer ticks occurring in time interval XA_MIN_TIME. This is the smallest number of clock ticks allowable to perform the transfer. It is calculated by dividing XA_MIN_TIME by XA_TICK_TIME. In the preferred embodiment with XA_MIN_TIME set to zero, XA_MIN_TICKS is also zero. XA_MAX_TICKS is the largest number of clock ticks allowable to perform the transfer. It is based upon XA_WRAP_TOL_ANGLE which is the time that the lead angles are considered to be the same as being in phase. It is calculated as ((360−XA_WRAP_TOL_ANGLE)*XA_TICKS_PER_DEGREE).

Using a phase lock loop (PLL) or other suitable means, the absolute angle of each source is calculated. The design and operation of a PLL to calculate the angles should be within the skill in the art, and need not be described herein in detail. The angle data is in the form of a sawtooth signal that starts at zero degrees at the sample coinciding with the negative to positive zero crossing of one selected phase of input voltages for the source being measured. Assuming that the number of samples per cycle is SAMP_PER_CYC, the angle increases by 360/SAMP_PER_CYC for each sample, with the SAMP_PER_CYCth sample having an angle of 360/SAMP_PER_CYC*(SAMP_PER_CYC−1).

By having the phase lock loops for each source implemented on digital signal processors (DSPs) that have the ability to communicate with each other, each DSP associated with each source provides the DSPs associated with all other sources with real-time data on the absolute angle of its source. In this manner every source DSP has real-time data on the absolute angle of all other sources.

At this point, the phase angles between the sources are calculated by simply subtracting the absolute angle signals from the two sources to be involved in a transfer from each other to form raw difference angles. The raw differences between angle signals α from any two DSPs can be in the range −360<α<360.

The angle differences are brought within the range $0 \leq \alpha < 360$, using the following calculation:

```
IF ( PHASE_360_xy < 0 )
    PHASE_360_xy = PHASE_360_xy + 360;
``` where the variable PHASE_360_xy denotes the number of degrees that source x leads source y.

The angle differences are brought within the range $-180 \leq \alpha < 180$, and the angle differences are placed in variables PHASExy. In this range of angles, if PHASExy is positive, then source x is leading source y, and if PHASExy is negative, then source x is lagging source y.

```
IF ( PHASE_360_xy >= 180 )
    PHASExy = PHASE_360_xy − 360;
ELSE
    PHASExy = PHASE_360_xy;
```

Finally, the transfer algorithm delay times, XA_TICKS_xy, are calculated. For any transfer between source x and source y, there must be a pre-calculated delay time, XA_TICKS_xy. This is the number of ticks calculated from the angular difference in phase between the off-going source, x, and on-coming source, y). In the equations below, an intermediate value XA_TICKS_TEMP is first calculated by multiplying the number of degrees phase difference, in the range of $0<\alpha<360$, by the number of ticks per degree. The intermediate number of ticks required to create a dynamic phase compensated transfer is then conditioned to determine if it is larger than constant XA_MAX_TICKS or smaller than XA_MIN_TICKS. If either of these conditions is true, the final calculated delay time, XA_TICKS_xy, is set equal to constant XA_MIN_TICKS, indicating that no delay is to be introduced into the transfer. If neither of the conditions is true, then the final calculated delay time, XA_TICKS_xy, is set equal to intermediate value XA_TICKS_TEMP.

```
XA_TICKS_TEMP = PHASE_360_xy *
XA_TICKS_PER_DEGREE;
IF ( XA_TICKS_TEMP < XA_MIN_TICKS || XA_TICKS_TEMP >=
XA_MAX_TICKS )
    XA_TICKS_xy = XA_MIN_TICKS;
ELSE
    XA_TICKS_xy = XA_TICKS_TEMP;
```

XA_TICKS_xy is then written to the FPGA state machine as logic variable TLIMIT for use in executing dynamic phase compensated transfer from source x to source y.

State Diagram for Transfer Operation

The FPGA 44 executes a state machine for initiating and executing the transfer from one power source to another by controlling the operation of the device sets. FIG. 2 illustrates a state diagram for a configuration with n available alternative power sources.

To help in the understanding of the state diagram of FIG. 2, the following variables are used in the description of the state diagram:

ASC is a logic variable that contains the active source command word, where ASC contains one bit associated with each of the possible n sources. When a bit in ASC is 1, then that source is designated as the active source. When a bit in ASC is 0, that source is designated as one of the inactive sources. ASC is generated by the main controller 38, based on a variety of inputs, including the status of the sources available to the SSTS, the health and operation of the solid state switching devices in the SSTS, external commands received from the facility or local operator commands. When the main controller 38 intends to initiate a transfer from one source to another, it does so by changing the value of logic variable ASC.

LAST_ASC is a logic variable that retains the last value of ASC after a transfer has been initiated by the main controller 38. LAST_ASC remains equal to ASC, until the transfer is initiated. When ASC and LAST_ASC are different, ASC represents the source being activated, while LAST_ASC represents the source being deactivated. Upon completion of the transfer, LAST_ASC is updated to reflect the current value of ASC.

I_POS is a logic variable that is TRUE when there is positive current flow from the source being deactivated to the load and there is no negative current flow from the source being deactivated to the load.

I_NEG is a logic variable that is TRUE when there is negative current flow from the source being deactivated to the load and there is no positive current flow from the source being deactivated to the load.

I_NONE is a logic variable that is TRUE when there is no positive or negative current flow from the source being deactivated to the load.

I_POS_GONE is a logic variable this is TRUE when there is no positive current flow from the source being deactivated to the load.

I_NEG_GONE is a logic variable that is TRUE when there is no negative current flow from the source being deactivated to the load.

TDELAY is fixed logic constant that represents the length of a time delay used to accommodate various elements of system operation delay, such as the transmit time for the fiber optic receivers and transmitters, the gate drive response time, and the SCR operation time. For the clock system described with reference to the preferred embodiment of the invention TDELAY is set at a constant value of 12. Since the basic system clock that initiates transitions from one state to another is 42 microseconds, TDELAY yields a basic delay time of 0.588 milliseconds.

TIMER is a logic variable used as a counter used to determine when TDELAY has been reached. TIMER is preferably 4-bits, allowing counting up to $2^4$ or 16 ticks.

TLIMIT is a logic variable supplied by the signal processing portions of the SSTS controls that represents the time delay required to accomplish a dynamic phase compensated transfer of the present invention. This logic variable is determined as explained above, and it is continuously updated as an instantaneous function of the phase angle between the sources.

CNT is a logic variable that acts as a timer used to determine when TLIMIT has been reached. CNT increments in units of TDELAY, i.e., values of TLIMIT represent multiples of time TDELAY. CNT is also preferably 4-bits.

XFR_STA is a logic variable that is TRUE when the state machine is in a stable state and no transfer is in progress.

GATE_ALL, GATE_W, GATE_P, GATE_N and GATE_HOLD are logic macros used to set the state machine SCR gate outputs, as discussed below.

Referring now to the state diagram FIG. 2, upon initial reset, the state machine enters state S0. This is an idle state entered only upon initial power up, where no source has yet been commanded to be active (ASC=0) and no SCRs are being gated. The state machine remains in this state until ASC≠0, at which time logic variable LAST_ASC is set to equal ASC and the transition is made to state S1.

The state S1 represents the stable state where no transfer is in progress and one source, as determined by the contents of logic variable ASC, is the active source. In this state, the state machine SCR gate outputs are set to reflect the contents of ASC by using a logic macro GATE_ALL. When the logic macro GATE_ALL is executed, the gate drives 16-21 are set, so that both positive and negative SCRs associated with the active source are gated, as well as the neutral conductor SCRs of the active source in SSTS units so equipped. The state machine output XFR_STA is set to TRUE, indicating that the state machine is in a stable state and that no transfer is in progress. Logic variable LAST_ASC keeps its value unchanged in this state. Logic variable CNT is set to −1 in preparation for the use of logic variable CNT in measuring inserted delay required to accomplish dynamic phase compensated transfers.

The state S1 remains the present state until such time as the logic variable ASC is set to a value not equal to the logic variable LAST_ASC. This inequality condition indicates that the main controller 38 has changed the logic variable ASC for the purpose of initiating a transfer to another source. Upon this inequality condition, the next state will be state S2.

The state S2 represents the state where the basic system transfer delay, as defined by the logic constant TDELAY, is accumulated. In this state, the logic macro GATE_W is executed, which sets the state machine outputs to the gate drives 16-21, so that only the neutral conductor SCRs of SSTS units so equipped are gated—all other SCRs are not gated. Logic variable LAST_ASC holds its value in this state. Logic variable TIMER increments by one for each edge of the state machine transition clock. Logic variable CNT holds its value in this state. The state machine remains in state S2 until logic variable TIMER is equal to logic constant TDELAY, i.e., until the logic variable TIMER has timed-out by reaching the value of the logic constant TDELAY. When that equality condition is true, the next active state will be state S3.

The state S3 is a decision making state, where the value of the logic variable CNT is tested to determine the next state. In this state, the logic macro GATE_W is again executed, which sets the state machine SCR gate outputs so that only the neutral conductor SCRs of SSTS units so equipped are gated—all other SCRs are not gated. The logic variable LAST_ASC holds its value in this state. The logic variable CNT is incremented by one immediately upon entry into this state. The logic variable CNT is then tested against the logic variable TLIMIT. If CNT=TLIMIT, then the next state will be state S4 and no additional delay will be added to the transfer. If CNT ≠TLIMIT, then the next state will again be state S2 where another set of TDELAY state transition clock edge times is accumulated. Since the logic variable CNT was initialized with value −1 in the state S1, if the logic variable TLIMIT contains value zero, then only one set of TDELAY state transition clock edge times is accumulated, representing the minimum allowable transfer delay. If the logic variable TLIMIT contains a non-zero value, that value will be the number of additional TDELAY state transition clock edges that will be accumulated. In this manner, the total transfer time delay inserted will always be equal to TDELAY * (TLIMIT+1) state transition clock edge times. After the appropriate number of state transition clock edge times have been accumulated, the next state is state S4.

The state S4 is a decision making state where the current flow status of the SCR set being deactivated is tested. In this state, the logic macro GATE_W is again executed, which sets the state machine SCR gate outputs so that only the neutral conductor SCRs of SSTS units so equipped are gated—all other SCRs are not gated. The logic variable LAST_ASC holds its value in this state. The logic variable I_POS is TRUE when there is positive current flowing in the SCR set being deactivated. If the logic variable I_POS is TRUE, the next active state will be state S5. The logic variable I_NEG is TRUE when there is negative current flowing in the SCR set being deactivated. If the logic variable I_NEG is TRUE, the next active state will be state S7. The logic variable I_NONE is TRUE when there is no current flowing in the SCR set being deactivated. If the logic variable I_NONE is TRUE, the next active state will be state S6.

The state S5 is a waiting state, where the state machine execution is paused until the positive current that caused the state S5 to be entered has ended. In this state, the logic macro GATE_P may be executed, if desired, which sets the state machine SCR gate outputs so that the positive SCRs associated with the source being activated are gated. In addition, the logic macro GATE_W is again executed, which sets the state machine SCR gate outputs so that the neutral conductor SCRs of SSTS units so equipped are gated. The logic variable LAST_ASC holds its value in this state. The logic variable I_POS_GONE is TRUE when there is no positive current flowing in the SCR set being deactivated. When the logic variable I_POS_GONE is TRUE, the next active state will be state S8.

The state S7 is a waiting state, where state machine execution is paused until the negative current that caused the state S7 to be entered has ended. In this state, the logic macro GATE_N may be executed, if desired, which sets the state machine SCR gate outputs so that the negative SCRs associated with the source being activated are gated. In addition, the logic macro GATE_W is again executed, which sets the state machine SCR gate outputs so that the neutral conductor SCRs of SSTS units so equipped are gated. The logic variable LAST_ASC holds its value in this state. The logic variable I_NEG_GONE is TRUE when there is no negative current flowing in the SCR set being deactivated. When the logic variable I_NEG_GONE is TRUE, the next active state will be the state S8.

The state S6 is a one state transition clock edge time waiting state. In this state, the logic macro GATE_W is again executed, which sets the state machine SCR gate outputs so that only the neutral conductor SCRs of SSTS units so equipped are gated-all other SCRs are not gated. The logic variable LAST_ASC holds its value in this state. Since the state S6 was entered based on the decision that no current was flowing in the SCR set associated with the source being deactivated, there is no need for further waiting. Consequently, the next active state will be the state S8.

The state S8 is the terminal state for which a transfer is considered in progress. In this state, the logic macro GATE_HOLD is executed, in which the state machine SCR gate outputs are held constant, i.e., whatever condition the SCR gate outputs were set when the state S8 was entered are held fixed while in the state S8. The logic variable LAST_ASC is set equal to logic variable ASC, in preparation for entry into the stable state S1. The next active state will be the state S1.

The state machine then returns to the state S1 and awaits a further transfer command as indicated by a change in the logic variable ASC.

The state machine described above with relation to FIG. 2 controls the gating of the SCRs in response to control inputs and the conduction status of the SCRs. Various methods of implementation are limited only by available technology. For example, the state machine could also be implemented by a software program running on a general purpose computer or PC, or by a dedicated hardware designed to execute the same steps and designed in accordance with techniques well-known in the art, or by a general purpose industrial logic controller, or by various other devices known to execute such logic.

System Operation

The operation of the present invention can be understood with reference to FIGS. 3-6.

Figure 3:
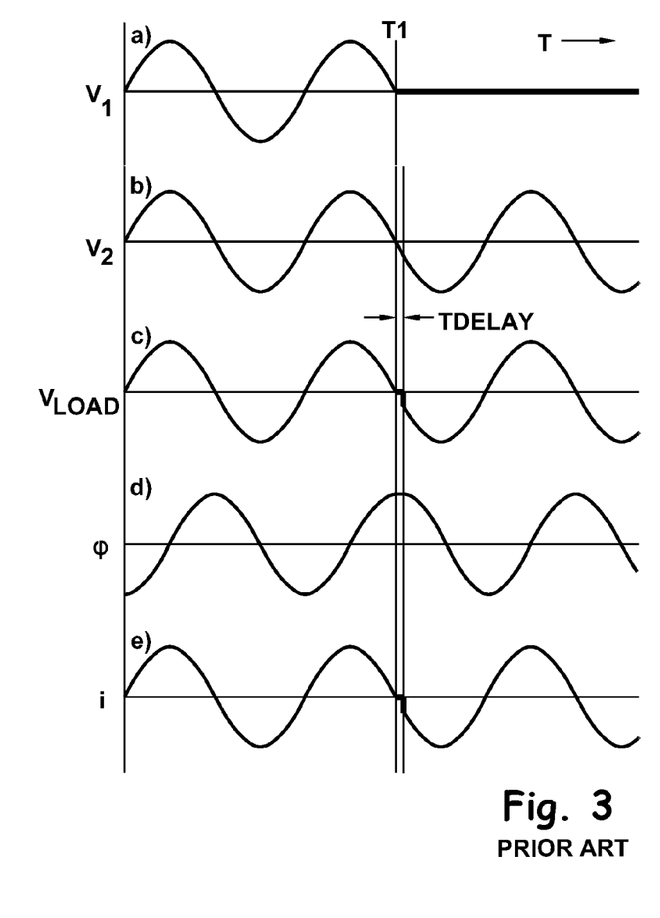
FIG. 3 is a representation of plots of voltage, flux and current versus time for selected parameters showing a transfer in which the two power sources are approximately in phase, and using a prior art system.
Figure 4:
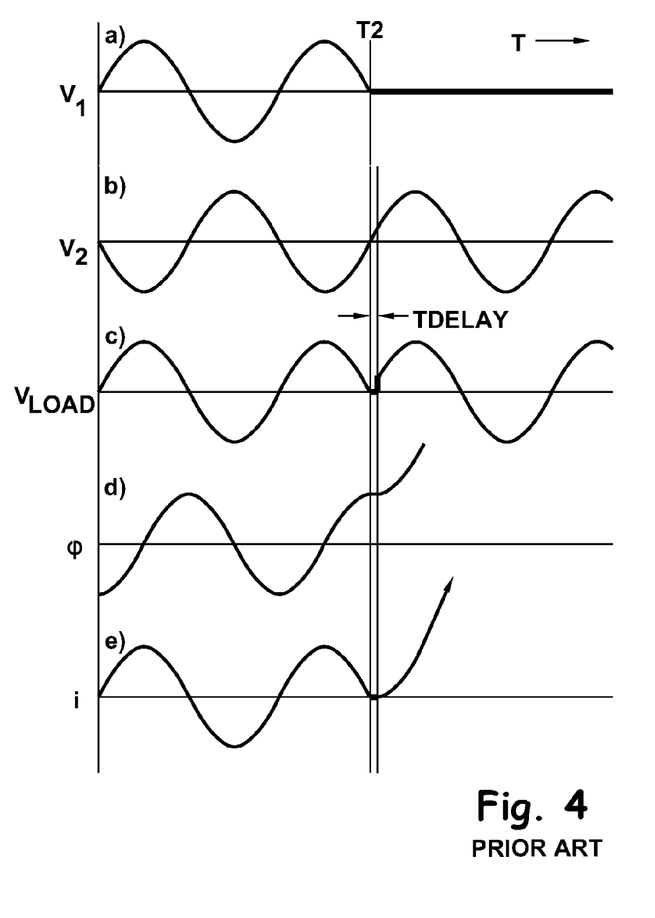
FIG. 4 is a representation of plots of voltage, flux and current versus time for the same selected parameters as FIG. 3, showing a transfer in which the two power sources are approximately in phase, but using the system of the present invention as depicted in FIG. 1.

FIGS. 3 and 4 depict typical SSTS operation without the benefit of the present invention.

Referring to FIG. 3, graph (a) shows the voltage level $V_1$ of one phase of a power source presently delivering power to the load, graph (b) shows the voltage level $V_2$ of the corresponding phase of a power source that is available but not presently powering the load, graph (c) shows the same phase of the SSTS output voltage $V_{OUT}$ being delivered to the load, graph (d) shows the transformer flux $\phi$ due to the SSTS output voltage being delivered to the transformer primary winding and the load, and graph (e) shows the current i being drawn by the transformer and the load connected to the transformer secondary winding. Note that the phase angle between the two sources $V_1$ and $V_2$ is nearly zero. At time T1, the voltage $V_1$ available from the active source is interrupted. After a very short time delay TDELAY, the voltage $V_2$ from the second source is connected to the transformer and the load, thereby restoring power flow to the load. Because the two sources $V_1$ and $V_2$ were nearly in phase, the small period of time where no voltage was applied to the transformer was of no consequence in creating a saturation situation.

FIG. 4 shows the same graphs (a)-(e) as FIG. 3, except in this case the two sources $V_1$ and $V_2$ are nearly 180° out of phase. At time T2, voltage $V_1$ available from the active source is interrupted. After a very short time delay TDELAY, the voltage $V_2$ from the second source is connected to the transformer and the load. Since the voltage $V_1$ from the initial source was interrupted near the voltage zero crossing, the flux $\phi$ in the transformer core was near peak value. When the second source $V_2$ applied voltage to the transformer, the phase difference between the initial and final sources causes the number of volt-seconds of flux $\phi$ in the transformer to rise to the point of transformer saturation. As shown on the graph (e) of SSTS output current i, a large amount of current flows through the transformer due to the drastically lowered magnetization impedance during transformer saturation.

Figure 5:
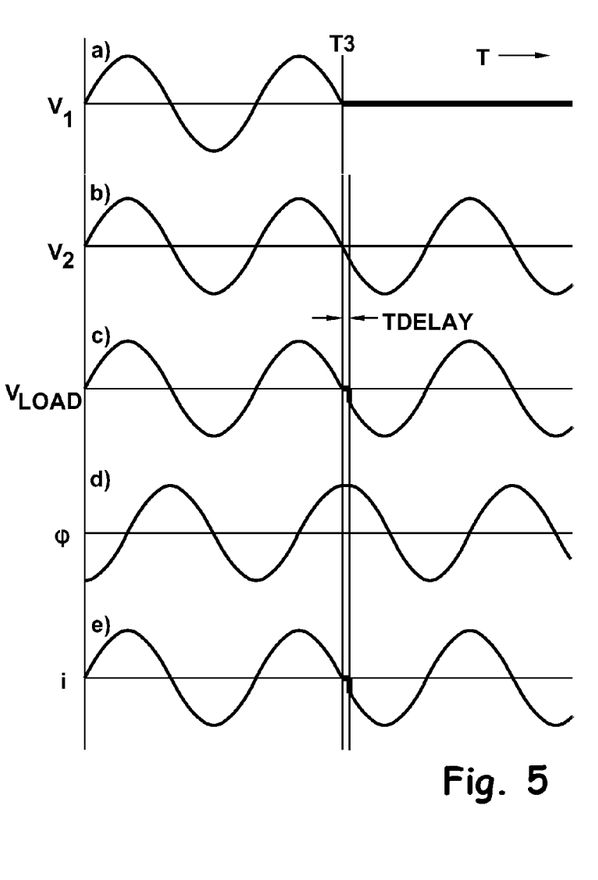
FIG. 5 is a representation of plots of voltage, flux and current versus time for the same selected parameters as FIGS. 3 and 4, showing a transfer in which the two power sources are approximately 180° out of phase, and using a prior art system.
Figure 6:
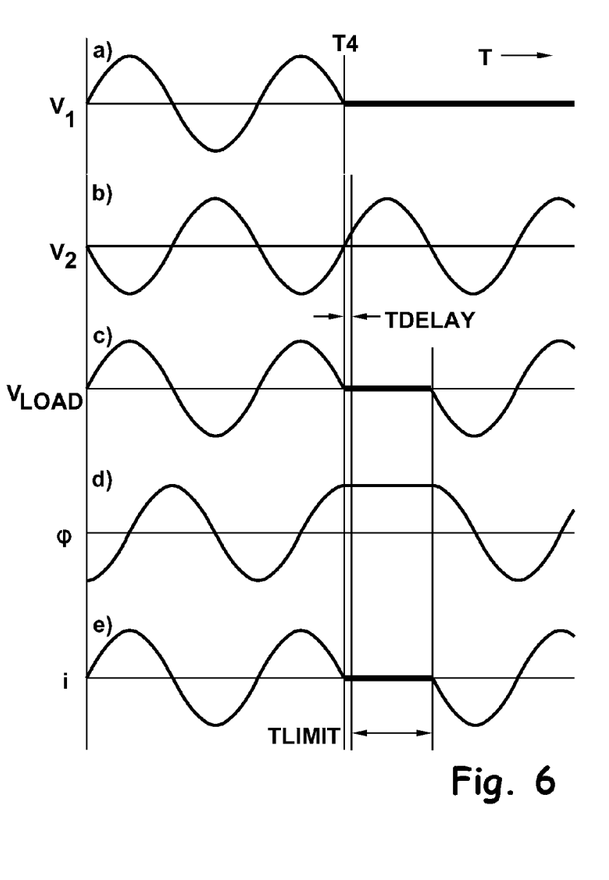
FIG. 6 is a representation of plots of voltage, flux and current versus time for the same selected parameters as FIGS. 3-5, showing a transfer in which the two power sources are approximately 180° out of phase as in FIG. 5, but using the system of the present invention as depicted in FIG. 1.

FIGS. 5 and 6 depict typical SSTS operation including present invention.

FIG. 5 depicts the SSTS operation in a situation comparable to that depicted in FIG. 3. Referring to FIG. 5, graph (a) shows the voltage level $V_1$ of one phase of a power source presently delivering power to the load, graph (b) shows the voltage level $V_2$ of the corresponding phase of a power source that is available but not presently powering the load, graph (c) shows the same phase of the SSTS output voltage $V_{OUT}$ being delivered to the load, graph (d) shows the transformer flux $\phi$ due to the SSTS output voltage being delivered to the transformer primary winding and the load and graph (e) shows the current i being drawn by the transformer and the load connected to the transformer secondary winding. Note that the phase angle between the two sources $V_1$ and $V_2$ is nearly zero. At time T3, the voltage $V_1$ available from the active source is interrupted. After a very short time delay TDELAY, the voltage $V_2$ from the second source is connected to the transformer and the load, thereby restoring power flow to the load. Because the two sources were nearly in phase, the small period of time where no voltage was applied to the transformer was of no consequence in creating a saturation situation. In this case, because the calculated phase difference between the sources was near zero, logic variable TLIMIT contained a value near zero, thus no additional delay was added to the transfer.

FIG. 6 shows the same graphs as FIG. 5, except in this case the two sources are nearly 180 degrees out of phase. At time T4, the voltage $V_1$ available from the active source is interrupted. After a time delay equal to the sum of TDELAY and TLIMIT, the voltage $V_2$ from the second source is connected to the transformer and the load. Since the voltage $V_1$ from the initial source was interrupted near the voltage zero crossing, the flux $\phi$ in the transformer core was near peak positive value. Because of the controlled delay equal to the sum of TDELAY and TLIMIT, the voltage $V_2$ of the second source is applied at such a time that the volt-seconds of flux do not increase to saturation. Consequently, a large current i is not drawn by the transformer due to lowered magnetization impedance. For any possible phase angle difference between the sources $V_1$ and $V_2$, the present invention provides for a controlled, calculated transfer delay that prevents increase of the flux $\phi$ to saturation levels.

If the load includes transformers built of ferromagnetic materials that are subject to saturation when the number of volt-seconds of flux applied to the transformer exceeds a threshold, as is commonly the case, the out-of-phase transfer has the consequence of adding volt-seconds of flux to the transformer far in excess of design limits, initiating a cascade of failures in the power system. Volt-seconds of flux are regarded as the time integral of voltage applied to the transformer. Either a small voltage applied for a long time or a large voltage applied for a short time has the same effect, i.e., exceeding the volt-second limit of the transformer. When a transformer saturates, the transformer begins drawing a large amount of current from its power source. This saturation current can cause upstream circuit breakers to trip open, as well as causing the uninterruptible power systems and engine generators to malfunction. Any of these consequences has devastating effects on a mission critical facility. If, as in this example, the transfer occurs at the end of one negative half-cycle of voltage, and it is followed by a portion of another negative half-cycle of voltage, the two consecutive negative half-cycles of voltage will exceed the transformer flux limit and start the cascade of failures.

It should be realized that the embodiment described herein is only representative of the invention and is not intended to limit the invention to one particular embodiment as the invention includes all embodiments falling within the scope of the appended claims. Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of transferring AC electrical power to a load from a first power source to a second power source, each of the power sources having a voltage waveform, comprising the steps of:
    (a) determining the phase difference between the voltage waveforms of the first and second power sources;
    (b) calculating a time delay from the phase difference determined in step a, the time delay corresponding to the instantaneous phase difference between the voltage waveform of the first power source and the voltage waveform of the second power source;
    (c) initiating a transfer from the first power source to the second power source by interrupting the supply of power from the first power source; and
    (d) connecting to the second power source after waiting for the period of the time delay calculated in step b.

2. A method of transferring as provided in claim 1, wherein the transfer is initiated in response to an unacceptable condition in the power from the first power source.

3. A method of transferring as provided in claim 1, wherein the phase difference at step a is determined repeatedly prior to initiating the transfer.

4. A method of transferring as provided in claim 3, wherein the time delay calculated in step b is continuously updated in response to the phase difference.

5. A method of transferring as provided in claim 1, wherein the phase difference at step a is continually determined while the first power source is connected to the load.

6. A method of transferring as providing in claim 1, wherein the transfer is performed by switching sets of solid-state gate-controlled current carrying devices.

7. A method of transferring AC electrical power to a load from a first power source to a second power source, each of the power sources producing a voltage waveform, comprising the steps of:
   (a) sensing the phase of the voltage waveform from the first power source;
   (b) sensing the phase of the voltage waveform from the second power source;
   (c) determining the difference between the phase sensed in steps a and b;
   (d) calculating a time delay from the phase difference determined in step c, the time delay corresponding to the instantaneous phase difference between the voltage waveform of the first power source and the voltage waveform of the second power source;
   (e) monitoring the voltage supplied by the first power source;
   (f) initiating a transfer from the first power source to the second power source in response to an unacceptable condition in voltage from the first power source monitored in step e by interrupting the supply of power from the first power source to the load; and
   (g) connecting the second power source after waiting for the period of the time delay calculated in step d.

8. A method of transferring as provided in claim 7, wherein the phase sensing at steps a and b are performed repeatedly before initiating the transfer.

9. A method of transferring as provided in claim 7, wherein the time delay calculated in step d is regularly updated in response to the phase sensing of steps a and b.

10. A method of transferring as provided in claim 7, wherein the time delay is calculated repeatedly in step d prior to initiating the transfer.

11. A method of transferring as providing in claim 7, wherein the switching is performed using sets of gate controlled current carrying devices.

12. A method of transferring as provided in claim 7, wherein the time delay is calculated so as to minimize any effect of transformer saturation in the load when power is transferred from the first power source to the second power source.

13. Apparatus for controlled switching of power supplied to a load from a first AC power source to a AC second power source, comprising:
   a first set of solid state switches coupled to a junction;
   a second set solid state switches coupled to the junction;
   monitoring circuits for monitoring a current state through the switches for the first and second sets of switches;
   a controller connected to the first and second switches for activating the switches, and connected to the monitoring circuit, the controller comprising a stored program for determining the phase of the voltage waveform from first power source,
   determining the phase of the voltage waveform from the second power source,
   determining the difference between the phase of the voltage wave form from the first power source and the phase of the voltage wave form from the second power source,
   calculating a time delay from the phase difference, the time delay corresponding to the instantaneous phase difference between the voltage waveform of the first power source and the voltage waveform of the second power source,
   initiating the first set of switches to transfer from the first power source to the second power source by interrupting the supply of power from the first power source, and
   initiating the second set of switches to connect to the second power source after waiting the period of the time delay.

14. Apparatus as provided in claim 13, wherein the controller determines the phase difference repeatedly prior to initiating the transfer.

15. Apparatus as provided in claim 14, wherein the controller calculates the time delay which is regularly updated in response to the phase difference.

16. Apparatus as provided in claim 13, wherein the transfer is performed by switching sets of solid-state gate-controlled current carrying devices.

17. Apparatus as providing in claim 13, wherein the first and second sets comprise sets of solid-state gate-controlled current carrying devices.

18. A method of transferring as provided in claim 1, wherein the time delay calculated in step b is less than a cycle of the voltage waveform of either the first or the second power sources.

19. A method of transferring as provided in claim 7, wherein the time delay calculated in step d is less than a cycle of the voltage waveform of either the first or the second power sources.

20. Apparatus as provided in claim 13, wherein the controller calculates a time delay which is less than a cycle of the voltage waveform of of either the first or the second power sources.

21. A method of transferring AC electrical power to a load from a first power source to a second power source, each of the power sources having a voltage waveform, comprising the steps of:
   (a) determining the phase difference between the voltage waveforms of the first and second power sources;
   (b) calculating a time delay from the phase difference determined in step a;
   (c) initiating a transfer from the first power source to the second power source by interrupting the supply of power from the first power source; and
   (d) connecting to the second power source after waiting for a period of time corresponding to the time delay calculated in step b;
wherein steps a and b are performed before step c.

* * * * *